United States Patent
Valdez et al.

(10) Patent No.: US 9,630,484 B1
(45) Date of Patent: Apr. 25, 2017

(54) VEHICLE ENGINE MOUNT STRUCTURE

(71) Applicant: Nissan North America, Inc., Franklin, TN (US)

(72) Inventors: Marco Antonio Flores Valdez, Mexico City (MX); Patrick Knight, Brighton, MI (US); Jeffrey Mazur, New Baltimore, MI (US); Tyler Burns, Ypsilanti, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/082,085

(22) Filed: Mar. 28, 2016

(51) Int. Cl.
*B60K 5/12* (2006.01)
*B60K 13/04* (2006.01)
*B60P 3/00* (2006.01)

(52) U.S. Cl.
CPC ............. *B60K 5/12* (2013.01); *B60K 5/1208* (2013.01); *B60K 13/04* (2013.01); *B60P 3/00* (2013.01)

(58) Field of Classification Search
CPC ...... B60K 5/12; B60K 5/1208; B60K 5/1216; B60K 5/1233
See application file for complete search history.

(56) References Cited

U.S. PATENT DOCUMENTS 7,213,801 B2 * 5/2007 Mayama ............... F16F 1/3732 267/140.13

* cited by examiner

Primary Examiner — Erez Gurari
(74) Attorney, Agent, or Firm — Global IP Counselors, LLP

(57) ABSTRACT

A vehicle engine mount structure includes a motor mount assembly, a motor bracket and a heat shield. The motor mount assembly has a first attachment part with a fastener receiving aperture, a vibration absorbing section and a second attachment part spaced apart from the first attachment part. The motor bracket has a first flange portion configured to support a vehicle engine and a second flange portion configured to attach to the second attachment part of the motor mount assembly. The heat shield is dimensioned to at least partially overlay the vibration absorbing section of the motor mount assembly and overlay the fastener receiving aperture with the heat shield being disposed between the motor mount assembly and the second flange portion of the motor bracket, and with the second flange portion of the motor bracket attached to the second attachment part of the motor mount assembly.

20 Claims, 7 Drawing Sheets

VEHICLE ENGINE MOUNT STRUCTURE

BACKGROUND

Field of the Invention

The present invention generally relates to a vehicle engine mount structure. More specifically, the present invention relates to a vehicle engine mount structure that includes a heat shield at least partially overlays a motor mount assembly thereby limiting the amount of heat radiated from the engine at a motor mount assembly.

Background Information

An engine within a vehicle is supported to the vehicle structure by motor mount assemblies. The motor mount assemblies usually include an elastic portion that is designed to absorb vibrations produced by the engine.

SUMMARY

One object of the present disclosure is to provide a motor mount assembly with a heat shield to protect the motor mount assembly from high levels of heat radiated from the engine and in particular radiated from an exhaust manifold of the engine.

In view of the state of the known technology, one aspect of the present disclosure is to provide a vehicle engine mount structure with a motor mount assembly, a motor bracket and a heat shield. The motor mount assembly has a first attachment part with a fastener receiving aperture and a second attachment part spaced apart from the first attachment part. The motor bracket has a first flange portion configured to support a vehicle engine and a second flange portion configured to attach to the second attachment part of the motor mount assembly. The heat shield is dimensioned to at least partially overlay the motor mount assembly and overlay the fastener receiving aperture with the heat shield being disposed between the second attachment part of the motor mount assembly and the second flange portion of the motor bracket, and with the second flange portion of the motor bracket attached to the second attachment part of the motor mount assembly.

BRIEF DESCRIPTION OF THE DRAWINGS

Referring now to the attached drawings which form a part of this original disclosure.

EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
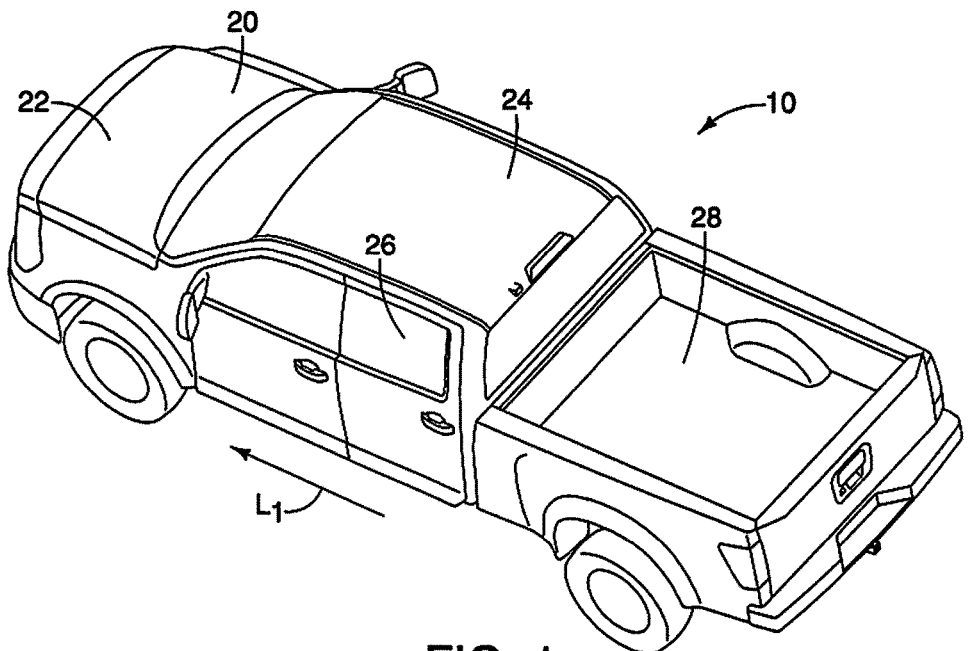
FIG. 1 is a perspective view of a vehicle that includes a vehicle engine mount structure in accordance with a first embodiment.
Figure 2:
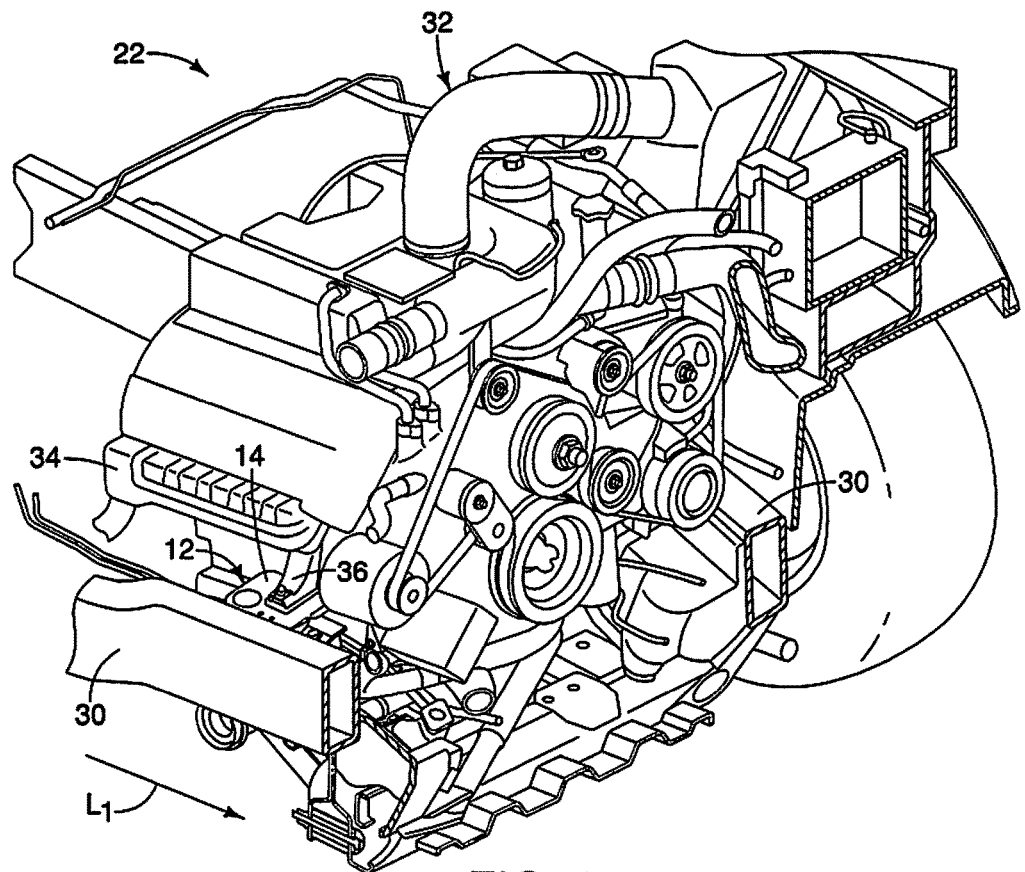
FIG. 2 is a perspective view of a portion of an engine compartment of the vehicle depicted in FIG. 1, showing an internal combustion engine having an exhaust manifold, with the internal combustion engine supported by the vehicle engine mount structure in accordance with the first embodiment.

Referring initially to FIG. 1, a vehicle 10 is illustrated in accordance with a first embodiment. As shown in FIG. 2, the vehicle 10 includes a vehicle engine mount structure 12 having a heat shield 14 located adjacent to and above a motor mount assembly 16. A description of the vehicle engine mount structure 12 and the heat shield 14 is provided below following a brief description of various features of the vehicle 10.

In the depicted embodiment shown in FIG. 1, the vehicle 10 is a pickup truck that includes a front end 20 that defines an engine compartment 22 (FIG. 2), a mid-section 24 that defines a passenger compartment 26 and a rear section 28 that defines a cargo area. It should be understood from the drawings and the description herein that the vehicle engine mount structure 12 and, more specifically, the heat shield 14 can be employed in any of a variety of vehicle designs and are not limited to use with the depicted pickup truck design.

As shown in FIG. 2, the vehicle 10 includes a pair of front side support members 30 (vehicle frame members) that extend in a forward vehicle longitudinal direction $L_1$. An internal combustion engine 32 is supported by the front side support members 30 in a manner described further below. The pair of front side support members 30 are similarly configured and shaped, with one of the front side support members 30 being located along one side of the internal combustion engine 32 and the other of the front side support members 30 being located along the other lateral side of the internal combustion engine 32. Therefore description of one of the front side support members 30 applies equally to both.

The front side support members 30 extend within the engine compartment 22 along-side respective lateral sides of the internal combustion engine 22. A rearward portion of each of the front side support members 30 extends under the passenger compartment 26 defining part of a support structure of the vehicle 10. Since the front side support members 30 are conventional vehicle structures, further description is omitted for the sake of brevity.

Figure 3:
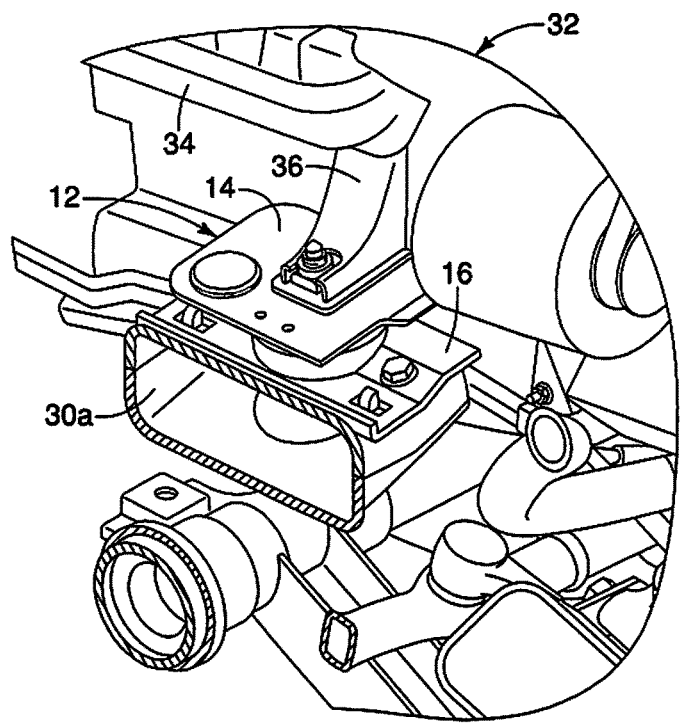
FIG. 3 is a perspective view of a portion of the internal combustion engine depicted in FIG. 2, showing the vehicle engine mount structure including a flange portion of a front side support member, a motor mount assembly, a heat shield and a motor bracket in accordance with the first embodiment.
Figure 4:
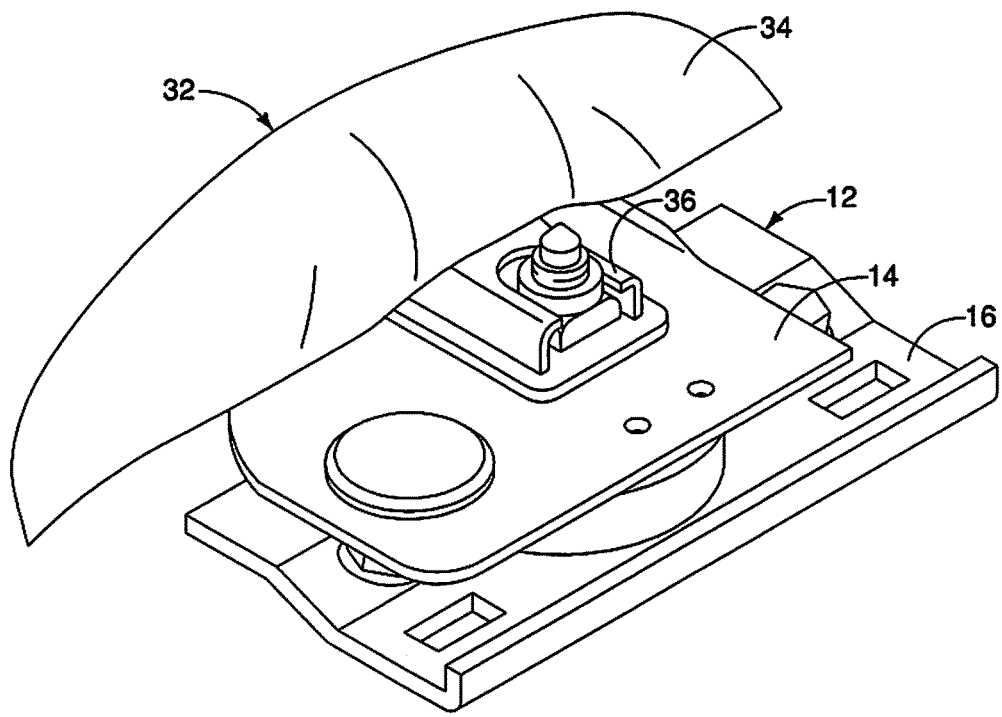
FIG. 4 is another perspective view of the vehicle engine mount structure showing the motor mount assembly, the heat shield and the motor bracket in accordance with the first embodiment.

The internal combustion engine 32 includes various conventional components, including an exhaust manifold 34 shown in FIGS. 2 and 3. Description of the various conventional components of the internal combustion engine 32 is omitted for the sake of brevity.

The internal combustion engine 32 also includes a pair of motor brackets 36 (only one shown in FIGS. 2-5), with one of the motor brackets 36 being located on opposite sides of the internal combustion engine 32. The motor brackets 36 are basically the same and therefore description of one applies equally to both. The motor bracket 36 is fastened to the internal combustion engine 32 via, for example, mechanical fasteners $F_1$ (FIG. 5) in a conventional manner. Since motor brackets 36 are conventional elements of the vehicle 10, further description is omitted for the sake of brevity.

As shown in FIGS. 2 and 3, the internal combustion engine 32 is supported on the front side support members 30 via the motor mount assembly 16. There are two motor mount assemblies 16 on opposite sides of the internal combustion engine 32 that are basically identical. Therefore, description of one of the motor mount assemblies 16 applies equally to both.

As shown in FIG. 3, a flange portion 30a of the front side support member 30 extends toward the internal combustion engine 32. The motor mount assembly 16 is fastened to the flange portion 30a. A distal end of the motor bracket 36 is further fastened to the motor mount assembly 16 via, for example, a nut N with the heat shield 14 being positioned above the motor mount assembly 16 but below the motor bracket 36 in a manner described in greater detail below.

A description of one of the vehicle engine mount structures 12 and its basic components is now provided with reference to FIGS. 3-12. There are two vehicle engine mount structures 12 on opposite sides of the internal combustion engine 32. The vehicle engine mount structures 12 are basically the same, but mirror images of one another. Description of one therefore applies equally to both. Therefore, only one of the vehicle engine mount structures 12 is described for the sake of brevity.

The vehicle engine mount structure 12 basically includes the flange portion 30a of the front side support member 30, the motor mount assembly 16, the motor brackets 36 and the heat shield 14.

Figure 5:
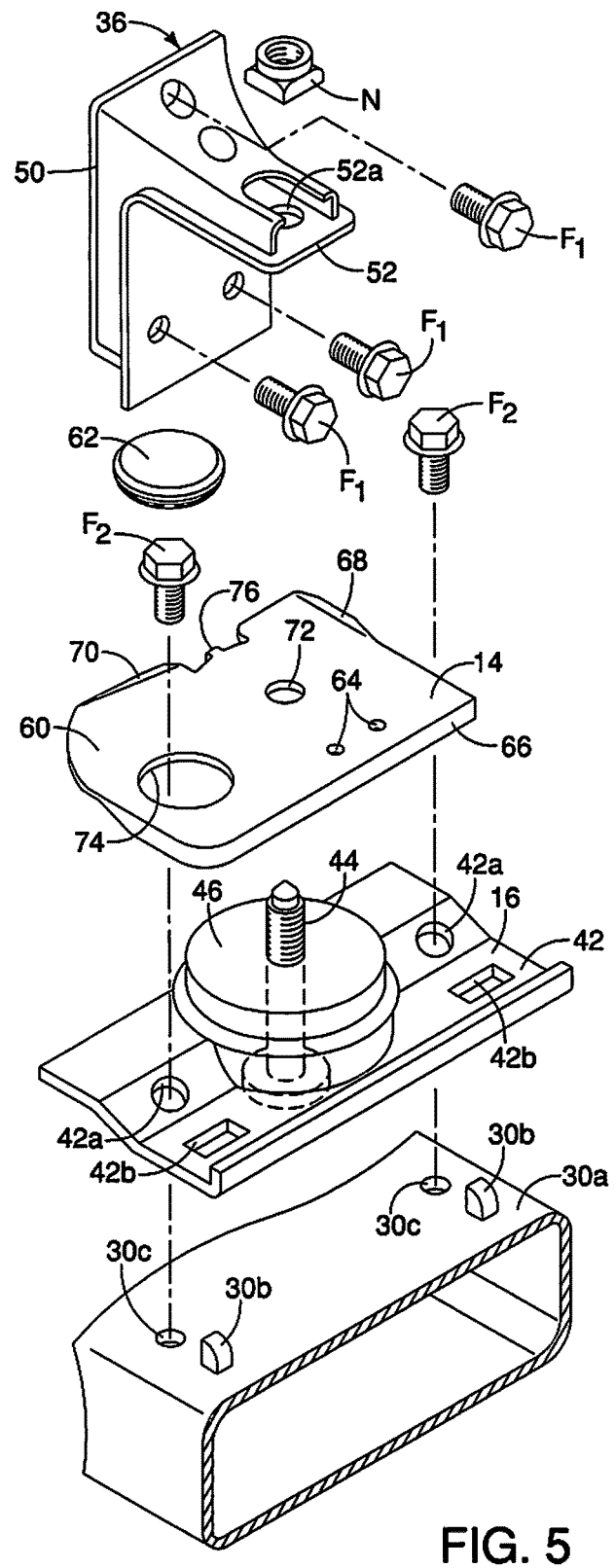
FIG. 5 is an exploded perspective view of the vehicle engine mount structure showing the flange portion of the front side support member, the motor mount assembly, the heat shield, a removable plug and the motor bracket in accordance with the first embodiment.
Figure 6:
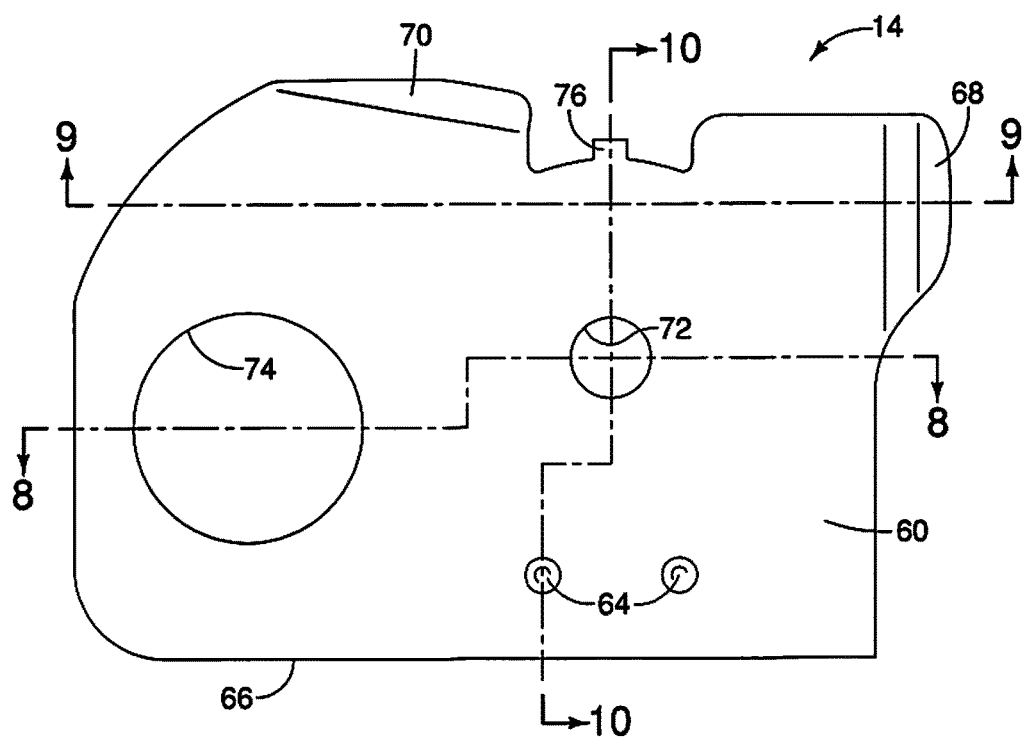
FIG. 6 is a top view of the heat shield shown removed from the vehicle engine mount structure in accordance with the first embodiment.
Figure 7:
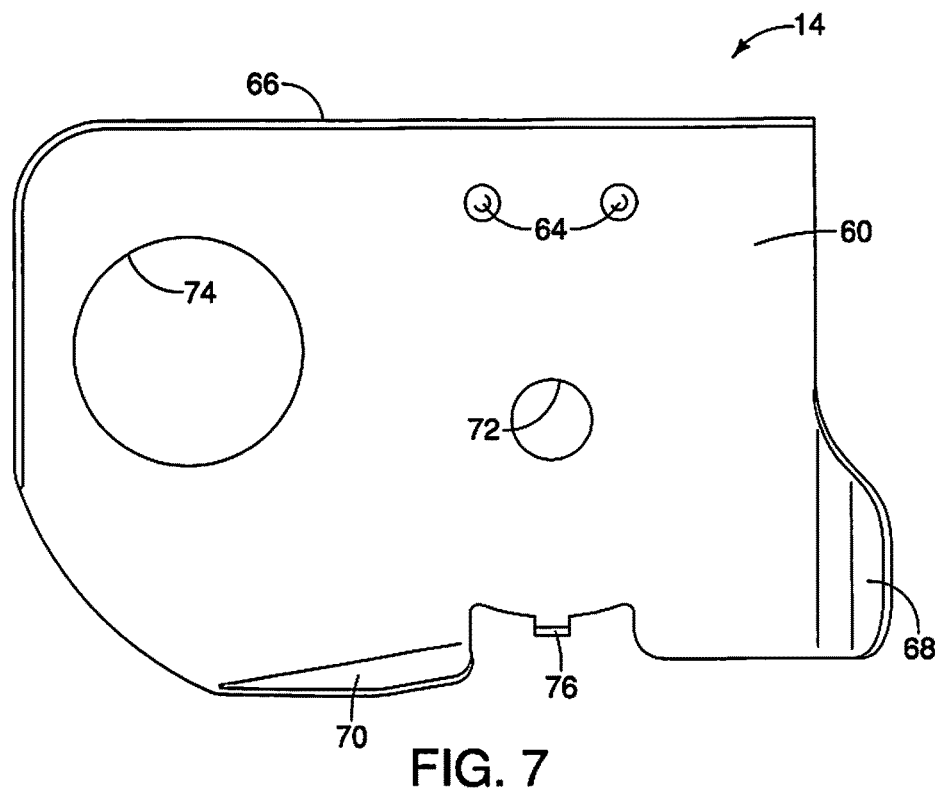
FIG. 7 is a bottom view of the heat shield in accordance with the first embodiment.
Figure 8:
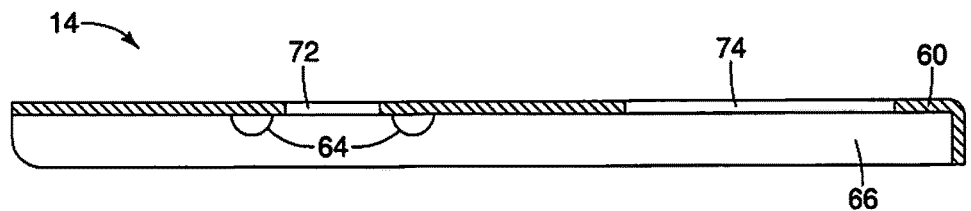
FIG. 8 is a first cross-sectional side view of the heat shield taken along the line 8-8 in FIG. 6 in accordance with the first embodiment.
Figure 9:
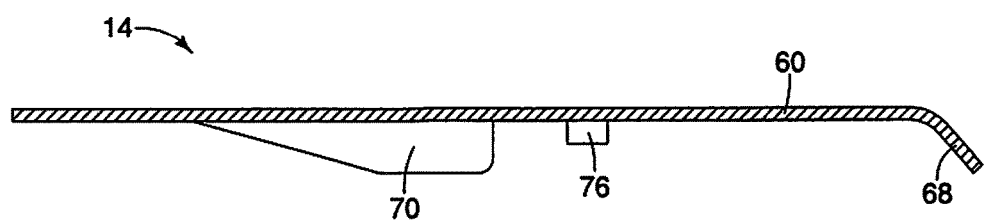
FIG. 9 is a second cross-sectional side view of the heat shield taken along the line 9-9 in FIG. 6 in accordance with the first embodiment.
Figure 10:
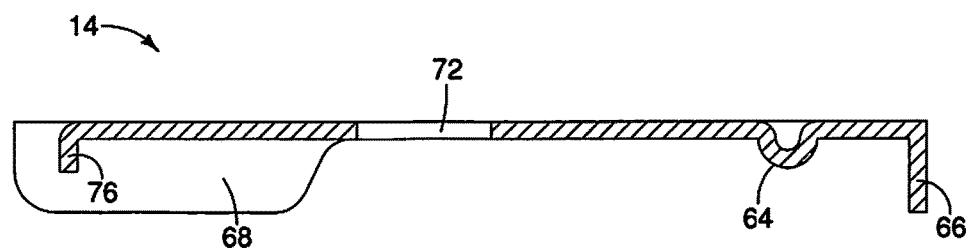
FIG. 10 is a third cross-sectional side view of the heat shield taken along the line 10-10 in FIG. 6 in accordance with the first embodiment.

The flange portion 30a is basically a beam welded to the front side support member 30 for the purpose of supporting the internal combustion engine 32. It should be understood from the drawings and the description herein that it is also possible to eliminate the flange portion 30a and install the motor mount assembly 16 directly to an upper surface of the front side support member 30, depending upon the overall design of the vehicle 10. As shown in FIG. 5, the flange portion 30a is provided with a pair of alignment pins 30b and fastener apertures 30c.

As shown in FIG. 5, the motor mount assembly 16 includes a first attachment part 42, a second attachment part 44 spaced apart from the first attachment part 42 and a vibration absorbing section 46. The vibration absorbing section 46 is basically an annular shaped elastic element that is fixedly attached to both the first attachment part 42 and the second attachment part 44.

The first attachment part 42 is basically a metallic plate element that includes fastener receiving apertures 42a and alignment slots 42b. The first attachment part 42 attaches to the flange portion 30a of the front side support member 30. Specifically, mechanical fasteners $F_2$ are inserted through the fastener receiving apertures 42a and then threaded into the fastener apertures 30c of the flange portion 30a. The first attachment part 42 can further include an aperture or apertures (not shown) that provide an attachment structure that engages and retains the vibration absorbing section 46 in a conventional manner. The second attachment part 44 is basically a threaded fastener as shown in FIG. 5 that has a lower end embedded in and/or otherwise retained within or below the vibration absorbing section 46 in a conventional manner. The lower end of the attachment part 44 (shown in phantom lines in FIG. 5) extends downward to a lower surface of the vibration absorbing section 46 such that when the nut N is tightened to the threads of the upper end of the attachment part 44, the vibration absorbing section 46 is compressed between the lower end of the second attachment part 44 and the second flange portion 52 of the motor bracket 36.

The vibration absorbing section 46 is made of a rubber or polymer material that has sufficient rigidity to securely engage the first attachment part 42 and the second attachment part 44, but also isolates engine vibration. In other words, the vibration absorbing section 46 serves as a cushion minimizing and/or dampening vibrations produced by the internal combustion engine 32 thereby preventing such vibrations from being transmitted to the front side support members 30 and the remainder of the vehicle 10. Since motor mount assemblies such as the motor mount assembly 16 are conventional vehicle components, further description of the motor mount assembly 16 is omitted for the sake of brevity.

A description of the motor bracket 36 is now provided with respect to FIG. 5. The motor bracket 36 is a metallic member that includes a first flange portion 50 and a second flange portion 52. The first flange portion 50 attaches to the internal combustion engine 32 via the mechanical fasteners $F_1$. The second flange portion 52 is rigidly fixed or welded to the first flange portion 50 and includes an aperture 52a that receives the second attachment part 44 (the threaded fastener end thereof) of the motor mount assembly 16. Once assembled, a nut N threads to the second attachment part 44, fixing the motor mount assembly 16 to the motor bracket 36.

A description of the heat shield 14 is now provided with specific reference to FIGS. 5-12. The heat shield 14 is basically a flat, plate-like metallic member designed to shield the motor mount assembly 16 from the heat radiated by the exhaust manifold 34. More specifically, the heat shield 14 is dimensioned to at least partially overlay the motor mount assembly 16 and overlay the fastener receiving aperture 42a of the motor mount assembly 16.

The heat shield 14 basically includes a main body 60 and a removable plug 62. The main body 60 is generally a planar, flat metal piece that includes a pair of alignment dimples 64, side flanges 66, 68 and 70, apertures 72 and 74, and a tab or flange 76. When fully installed, the heat shield 14 is fixed the second attachment part 44 of the motor mount assembly 16 and disposed between the vibration absorbing section 46 and the second flange portion 52 of the motor bracket 36.

The pair of alignment dimples 64 are provided for purposes of assisting assembly of the vehicle engine mount structure 12. A technician installing the heat shield 14 uses the dimples 64 to determine the correct orientation of the heat shield 14 during installation. The side flanges 66, 68 and 70 all extend downward away from the main body 60 once installed to the motor mount assembly 16 to shield the motor mount assembly 16 from heat and weather related elements, such as water. The aperture 72 is dimensioned to receive the second attachment part 44 of the motor mount assembly 16. The aperture 74 is provided in order to more easily access the mechanical fasteners $F_2$. The aperture 74 is aligned with one of the fastener receiving apertures 42a of the motor mount assembly 16 and a corresponding one of the fastener apertures 30c of the front side support member 30. In other words, with the heat shield 14 covering portions of the motor mount assembly 16, the installation of one of the mechanical fastener $F_2$ to the flange portion 30a of the front side support member 30 can be difficult. The aperture 74 provides a way for a tool to easily access and tighten the mechanical fastener $F_2$ during installation and/or removal of the motor mount assembly 16. The tab or flange 76 also provides a further alignment portion to help install and maintain positioning of the heat shield 14.

Figure 11:
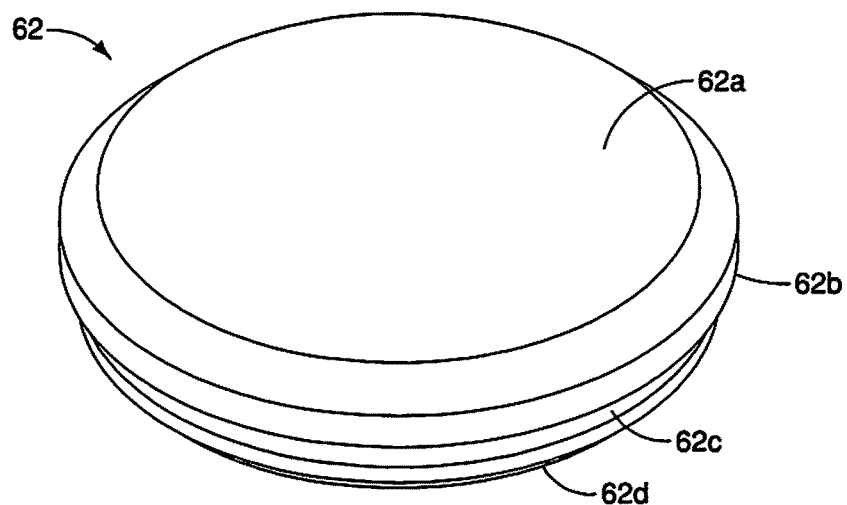
FIG. 11 is a perspective view of the removable plug shown removed from the heat shield in accordance with the first embodiment.
Figure 12:
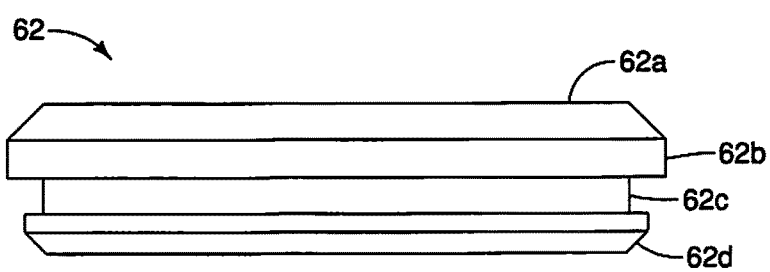
FIG. 12 is a side view of the removable plug in accordance with the first embodiment.

As shown in FIGS. 5, 11 and 12, the removable plug 62 is a disk shaped element that is preferably made of thermal and chemical resistant material that is also resilient such that it can be installed and later removed, if necessary. For example, the removable plug 62 can be made of a resilient plastic or polymer material with the above mentioned properties. The removable plug 62 is a removable cover that is inserted into the aperture 74 after the vehicle engine mount structure 12 is fully assembled. In the first embodiment, the plug 62 is a solid disk shaped member that completely covers the aperture 74 of the heat shield 14 when inserted into the aperture 74, thereby providing heat shielding protection for the motor mount assembly 16.

The plug 62 has a flat, closed upper portion 62a with an annular lip 62b extending downward therefrom. As shown in FIG. 12, the annular lip 62b includes an annular recess or groove 62c that receives the main body 60 of the heat shield 14 when the plug 62 is installed in the aperture 74 of the heat shield 14. A lower edge 62d of the annular lip 62b is provided with a chamfered outer edge to make insertion into the aperture 74 a simple operation.

Second Embodiment

Figure 13:
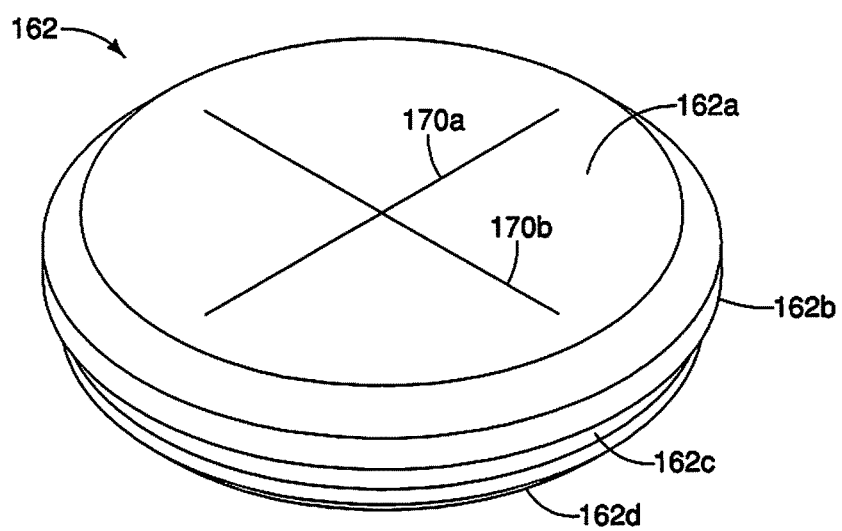
FIG. 13 is a perspective view of a removable plug shown removed from the heat shield in accordance with a second embodiment.
Figure 14:
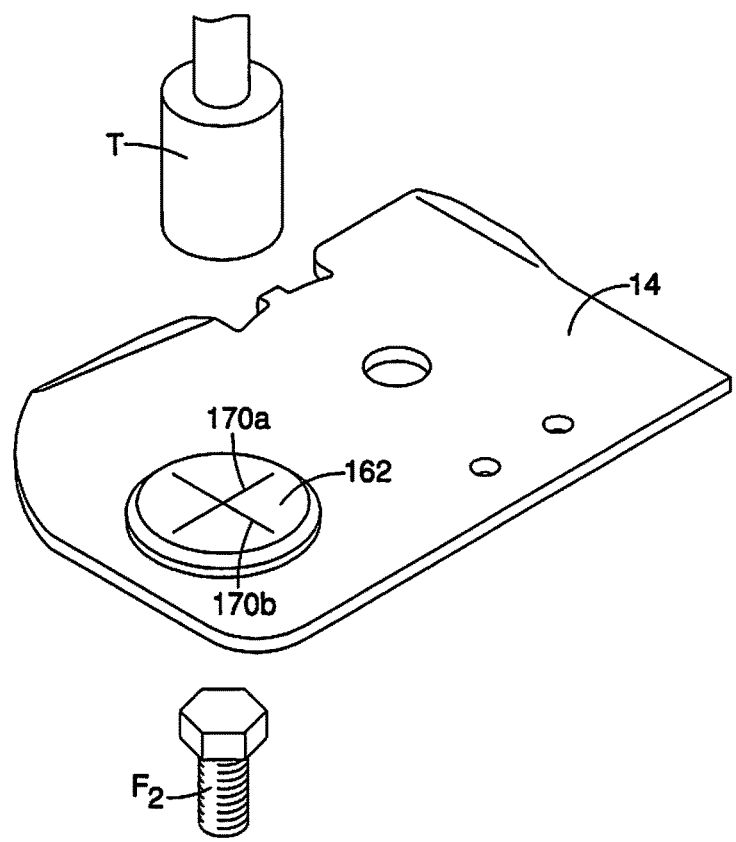
FIG. 14 is a perspective view of the removable plug installed to the heat shield showing a tool approaching the removable plug in accordance with the second embodiment.
Figure 15:
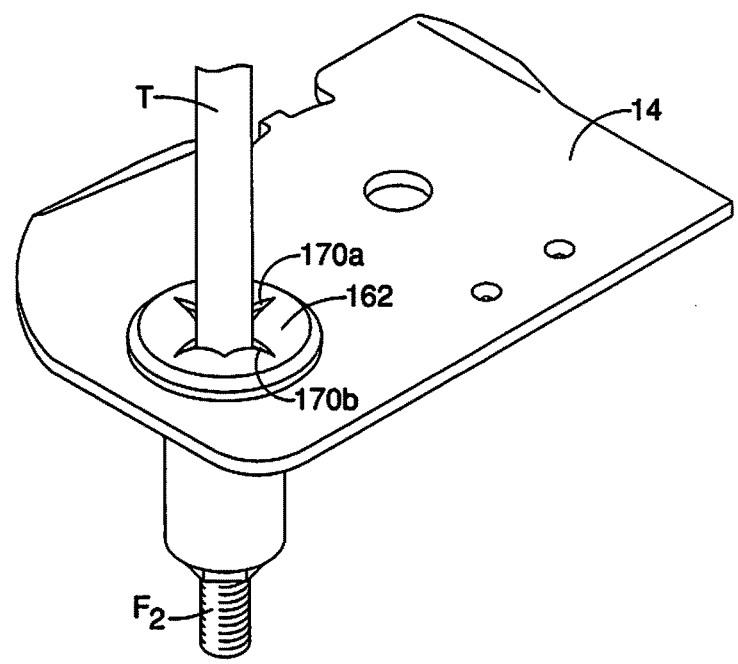
FIG. 15 is another perspective view of the removable plug installed to the heat shield similar to FIG. 14 showing the tool inserted past flaps of the removable plug in order to tighten or loosen a fastener beneath the removable plug in accordance with the second embodiment.

Referring now to FIGS. 13-15, a plug 162 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (') or a double prime (").

The plug 162 (a removable cover) is dimensionally identical to the plug 62 of the first embodiment and includes an upper portion 162a, an annular lip 162b, an annular recess or groove 162c and a lower edge 162d (a chamfered outer edge). The annular lip 162b, the annular recess or groove 162c and the lower edge 162d are basically the same as the annular lip 62b, the annular recess or groove 62c and the lower edge 62d of the first embodiment, respectively. However, in the second embodiment, the upper portion 162a includes a plurality of flaps 170a and 170b be defined by slits in the upper portion 162a. The flaps 170a and 170b are able to flex in response to a tool T being pushed against the plurality of flaps 170a and 170b, thereby defining an opening in the plug 162 (FIG. 15). The tool T can be pushed past the flaps 170a and 170b to engage, tighten or loosen the fastener $F_2$. After the tool T is removed, the plurality of flaps 170a and 170b return to the shape shown in FIG. 14 thereby concealing the opening in the absence of the tool T.

The various elements and features of the vehicle 10 other than the heat shield 14 are conventional components that are well known in the art. Since these elements and features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the engine mount structure. Accordingly, these terms, as utilized to describe the present invention should be interpreted relative to a vehicle equipped with the engine mount structure.

The term "configured" as used herein to describe a component, section or part of a device includes hardware and/or software that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle engine mount structure, comprising:
a motor mount assembly having a first attachment part with a fastener receiving aperture, a vibration absorbing section and a second attachment part spaced apart from the first attachment part by the vibration absorbing section;
a motor bracket having a first flange portion configured to support a vehicle engine and a second flange portion configured to attach to the second attachment part of the motor mount assembly;
a heat shield dimensioned to at least partially overlay the vibration absorbing section of the motor mount assembly and overlay the fastener receiving aperture with the heat shield being disposed between the vibration absorbing section of the motor mount assembly and the second flange portion of the motor bracket, and with the second flange portion of the motor bracket attached to the second attachment part of the motor mount assembly, the heat shield including an aperture aligned with the fastener receiving aperture of the motor mount assembly; and
a removable cover inserted into the aperture of the heat shield with the removable cover being spaced apart from the fastener receiving aperture of the motor mount assembly.

2. The vehicle engine mount structure according to claim 1, wherein
the removable cover is made of a resilient material.

3. The vehicle engine mount structure according to claim 2, wherein
the removable cover includes a plurality of flaps that flex in response to a tool being pushed against the plurality of flaps defining an opening in the removable cover, the plurality of flaps concealing the opening in the absence of the tool.

4. The vehicle engine mount structure according to claim 2, wherein
the removable cover is a solid disk shaped member that completely covers the aperture of the heat shield when inserted into the aperture.

5. The vehicle engine mount structure according to claim 1, wherein
the vibration absorbing section of the motor mount assembly is fixedly attached to the first attachment part and the second attachment part, the vibration absorbing section separating the first and second attachment part of the motor mount assembly.

6. The vehicle engine mount structure according to claim 1, wherein
the vibration absorbing section of the motor mount assembly is made of an elastic polymer material.

7. The vehicle engine mount structure according to claim 1, wherein
the heat shield includes at least one alignment projection.

8. The vehicle engine mount structure according to claim 1, wherein
the heat shield includes a main body portion disposed between the vibration absorbing section of the motor mount assembly and the second flange portion of the motor bracket, the main body portion extending over the fastener receiving aperture of the first attachment part of the motor mount assembly.

9. A vehicle engine mount structure, comprising:
a vehicle frame member;
a motor mount assembly having a first attachment part with a fastener receiving aperture, a vibration absorbing section and a second attachment part spaced apart from the first attachment part, with a fastener installed through the fastener receiving aperture into the vehicle frame member;
a vehicle engine;
a motor bracket having a first flange portion attached to the vehicle engine and a second flange portion configured to attach to the second attachment part of the motor mount assembly;
a heat shield dimensioned to at least partially overlay the vibration absorbing section of the motor mount assembly and overlay the fastener receiving aperture of the motor mount assembly with the heat shield being disposed the vibration absorbing section of the motor mount assembly and the second flange portion of the motor bracket, and with the second flange portion of the motor bracket attached to the second attachment part of the motor mount assembly, the heat shield including an aperture aligned with the fastener receiving aperture of the motor mount such that the fastener is accessible via the fastener receiving aperture; and
a removable cover inserted into the aperture with the removable cover being spaced apart from the fastener and the fastener receiving aperture.

10. The vehicle engine mount structure according to claim 9, wherein
the removable cover is made of a resilient material.

11. The vehicle engine mount structure according to claim 10, wherein
the removable cover includes a plurality of flaps that flex in response to a tool being pushed against the plurality of flaps thereby defining an opening in the removable cover, the plurality of flaps concealing the opening in the absence of the tool.

12. The vehicle engine mount structure according to claim 10, wherein
the removable cover is a solid disk shaped member that completely covers the aperture of the heat shield with inserted into the aperture.

13. The vehicle engine mount structure according to claim 9, wherein
the vibration absorbing section of the motor mount assembly is fixedly attached to the first attachment part and the second attachment part, the vibration absorbing section separating the first and second attachment part of the motor mount assembly.

14. The vehicle engine mount structure according to claim 9, wherein
the heat shield includes at least one alignment projection.

15. The vehicle engine mount structure according to claim 9, where
the vehicle engine includes an exhaust manifold located above the motor mount assembly and the heat shield.

16. The vehicle engine mount structure according to claim 9, wherein
the heat shield includes a main body portion disposed between the vibration absorbing section of the motor mount assembly and the second flange portion of the motor bracket, the main body portion extending over the fastener receiving aperture of the first attachment part of the motor mount assembly.

17. The vehicle engine mount structure according to claim 1, further comprising:
a fastener installed to the motor mount assembly, extending through the fastener receiving aperture and through a corresponding aperture in the motor bracket such that the fastener is spaced apart from the aperture of the heat shield and is also spaced apart from the removable cover.

18. A vehicle engine mount structure, comprising:
a motor mount assembly having a first attachment part with a fastener receiving aperture, a vibration absorbing section and a second attachment part spaced apart from the first attachment part by the vibration absorbing section;
a motor bracket having a first flange portion configured to support a vehicle engine and a second flange portion configured to attach to the second attachment part of the motor mount assembly;
a heat shield dimensioned to at least partially overlay the vibration absorbing section of the motor mount assembly and overlay the fastener receiving aperture with the heat shield being disposed between the vibration absorbing section of the motor mount assembly and the second flange portion of the motor bracket, and with the second flange portion of the motor bracket attached to the second attachment part of the motor mount assembly; and
a removable cover inserted into the aperture of the heat shield, the removable cover being made of a resilient material.

19. The vehicle engine mount structure according to claim 18, wherein
the removable cover includes a plurality of flaps that flex in response to a tool being pushed against the plurality of flaps defining an opening in the removable cover, the plurality of flaps concealing the opening in the absence of the tool.

20. The vehicle engine mount structure according to claim 18, wherein
the removable cover is a solid disk shaped member that completely covers the aperture of the heat shield when inserted into the aperture.

\* \* \* \* \*